US012777365B2

(12) United States Patent
Lee et al.

(10) Patent No.: US 12,777,365 B2
(45) Date of Patent: Oct. 27, 2026

(54) APPARATUS AND METHOD FOR ROUTING DNS TRAFFIC OF HOME ROUTED SESSION BREAKOUT SESSION IN WIRELESS COMMUNICATION SYSTEM

(71) Applicant: Samsung Electronics Co., Ltd., Gyeonggi-do (KR)

(72) Inventors: Jicheol Lee, Gyeonggi-do (KR); Hyesung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 305 days.

(21) Appl. No.: 18/410,089

(22) Filed: Jan. 11, 2024

(65) Prior Publication Data

US 2024/0244477 A1 Jul. 18, 2024

(30) Foreign Application Priority Data

Jan. 13, 2023 (KR) ........................ 10-2023-0005436

(51) Int. Cl.
*H04W 4/00* (2018.01)
*H04W 28/02* (2009.01)
*H04W 48/16* (2009.01)

(52) U.S. Cl.
CPC ....... *H04W 28/0273* (2013.01); *H04W 48/16* (2013.01)

(58) Field of Classification Search
CPC .......................... H04W 28/0273; H04W 48/16
See application file for complete search history.

(56) References Cited

U.S. PATENT DOCUMENTS

2019/0387576 A1* 12/2019 Yang ..................... H04W 48/18
2019/0394833 A1* 12/2019 Talebi Fard .......... H04W 60/00
2021/0185527 A1* 6/2021 Li .......................... H04L 63/08
2021/0219124 A1* 7/2021 Ying ..................... H04W 48/18
2022/0053602 A1 2/2022 Kim et al.
2022/0201543 A1* 6/2022 Zhu ................... H04W 28/0925
2022/0264690 A1* 8/2022 Zhu ....................... H04W 76/22
(Continued)

FOREIGN PATENT DOCUMENTS

CN 114945015 8/2022
KR 10-2023-0050048 4/2023
(Continued)

OTHER PUBLICATIONS

Samsung, "The Procedure for HR PDU Session for Supporting Session Breakout in VPLMN", S2-2210731, 3GPP TSG-WG SA2 Meeting #154, Nov. 14-18, 2022, 7 pages.
(Continued)

*Primary Examiner* — Abdelnabi O Musa
(74) *Attorney, Agent, or Firm* — The Farrell Law Firm, P.C.

(57) ABSTRACT

The disclosure relates to a 5G or 6G communication system for supporting a higher data transmission rate. A method performed by a first SMF entity of a first network in a wireless communication system according to the disclosure includes receiving, from an AMF entity, an SM context creation request message including an ID of a second SMF of a second network, HR-SBO allowance information, and PDU session creation information; and selecting an EASDF entity or a plurality of candidate EASDF entities of a first network based on the SM context creation request message.

16 Claims, 11 Drawing Sheets

(56) References Cited

U.S. PATENT DOCUMENTS

| | | | | |
|---|---|---|---|---|
| 2022/0360977 | A1* | 11/2022 | Kim | H04W 8/08 |
| 2022/0400460 | A1* | 12/2022 | Li | H04W 76/30 |
| 2022/0408333 | A1* | 12/2022 | Ryu | H04L 67/141 |
| 2023/0116405 | A1 | 4/2023 | Lee | |
| 2023/0132454 | A1* | 5/2023 | Kim | H04M 15/66 370/329 |
| 2024/0195846 | A1* | 6/2024 | Zhang | H04W 76/22 |
| 2024/0224009 | A1* | 7/2024 | Kim | H04W 8/12 |

FOREIGN PATENT DOCUMENTS

| | | |
|---|---|---|
| WO | WO 2022/034525 | 2/2022 |
| WO | WO 2022/206260 | 10/2022 |

OTHER PUBLICATIONS

Ericsson, “Discussion of the Editor’s Notes for HR-SBO Scenario”, S2-2300921, 3GPP TSG-SA WG2 Meeting #154AH, Jan. 16-20, 2023, 5 pages.
International Search Report dated Apr. 4, 2024 issued in counterpart application No. PCT/KR2024/000539, 8 pages.
Qualcomm Incorporated, “KI#1: New Solution for HR+SBO Scenario”, S2-2207743, 3GPP TSG-SA WG2#152E e-meeting, Aug. 17-26, 2022, 5 pages.
3GPP TR 23.700-48 V18.0.0, (Dec. 2022), pp. 196.
European Search Report dated Mar. 6, 2026 issued in counterpart application No. 24741724.9-1206, 13 pages.

* cited by examiner

CONTINUE

APPARATUS AND METHOD FOR ROUTING DNS TRAFFIC OF HOME ROUTED SESSION BREAKOUT SESSION IN WIRELESS COMMUNICATION SYSTEM

CROSS REFERENCE TO RELATED APPLICATION

The present application claims priority to Korean Patent Application No. 10-2023-0005436, which was filed in the Korean Intellectual Property Office on Jan. 13, 2023, the entire content of which is incorporated herein by reference.

BACKGROUND

1. Field

The disclosure relates generally to a wireless communication system, and more particularly, to subscriber information for supporting a session breakout method through addition/change/delete of a local user plane function (UPF) in a visited network for a home routed session of a terminal roaming in a cellular wireless communication system and a session management (SM) method based on the subscriber information, a method for transmitting and receiving domain name service (DNS) traffic between a terminal and a visited-edge application server (EAS) discovery function (V-EASDF) in a visited public land mobile network (VPLMN).

2. Description of the Related Art

Fifth generation (5G) mobile communication technologies define broad frequency bands such that relatively higher transmission rates and new services are possible, and can be implemented in “sub 6 gigahertz (GHz)” bands, such as 3.5 GHz, as well as in “above 6 GHz” bands, which may be referred to as millimeter wave (mmWave), including 28 GHz and 39 GHz. In addition, it has been considered to implement sixth generation (6G) mobile communication technologies (which may be referred to as beyond 5G systems) in terahertz (THz) bands (e.g., 95 GHz to 3 THz bands) in order to accomplish transmission rates fifty times faster than 5G mobile communication technologies and ultra-low latencies one-tenth of 5G mobile communication technologies.

Since the initial development of 5G mobile communication technologies, in order to support services and to satisfy performance requirements in connection with enhanced mobile broadband (eMBB), ultra-reliable low latency communications (URLLC), and massive machine-type communications (mMTC), there has been ongoing standardization regarding beamforming and massive multiple input-multiple output (MIMO) for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods, such as a low density parity check (LDPC) code for large amount of data transmission and a polar code for highly reliable transmission of control information, layer 2 (L2) pre-processing, and network slicing for providing a dedicated network specialized to a specific service.

There are also ongoing discussions regarding improvement and performance enhancement of initial 5G mobile communication technologies in view of services to be supported by newer 5G mobile communication technologies including physical layer standardization regarding technologies, such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN) which is UE-satellite direct communication for providing coverage in an area in which communication with terrestrial networks is unavailable, and positioning.

There is also ongoing standardization in air interface architecture/protocol regarding technologies, such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR).

There is also ongoing standardization in system architecture/service regarding a 5G baseline architecture (e.g., service-based architecture or service-based interface) for combining network functions virtualization (NFV) and software-defined networking (SDN) technologies, and mobile edge computing (MEC) for receiving services based on UE positions.

As 5G mobile communication systems are commercialized, the number of devices that will be connected to communication networks is expected to exponentially increase, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR), etc., 5G performance improvement and complexity reduction by utilizing artificial intelligence (AI) and machine learning (ML), AI service support, metaverse service support, and drone communication.

Further, such development of 5G mobile communication systems will serve as a basis for developing new waveforms for providing coverage in THz bands of 6G mobile communication technologies, multi-antenna transmission technologies, such as full dimensional MIMO (FD-MIMO), array antennas and large-scale antennas, metamaterial-based lenses and antennas for improving coverage of THz band signals, high-dimensional space multiplexing technology using orbital angular momentum (OAM), and reconfigurable intelligent surface (RIS), as well as full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

An aspect of the disclosure is to provide a technology that allows a roaming terminal to access an EAS provided in an edge computing environment of a VPLMN network using uplink classifier (ULCL)/branching point (BP) technology, which is a 5G SM function (SMF), in the VPLMN by using a home routed session.

An aspect of the disclosure is provide a VPLMN network structure that provides, in one protocol data unit (PDU) session, a home routed session breakout (HR-SBO) that allows connection to a data network (DN) provided by a home network while simultaneously connecting to a local DN provided by a visited network, a method for routing DNS traffic that a terminal transmits and receives to and from a V-EASDF in a UPF of a VPLMN, and a technology for selecting a V-EASDF and routing DNS traffic to the V-EASDF.

In accordance with an aspect of the disclosure, a method performed by a first SMF entity of a first network in a wireless communication system is provided. The method includes receiving, from an access and mobility management function (AMF) entity, an SM context creation request message including an identifier (ID) of a second SMF of a second network, HR-SBO allowance information, and PDU session creation information; and selecting an EAS discovery function (EASDF) entity or a plurality of candidate EASDF entities of a first network based on the SM context creation request message.

In accordance with another aspect of the disclosure, a first SMF entity of a first network in a wireless communication system is provided. The first SMF entity includes a transceiver; and a processor connected to the transceiver. The processor is configured to receive, from an AMF entity, an SM context creation request message including an ID of a second SMF of a second network, HR-SBO allowance information, and PDU session creation information, and to select an EASDF entity or a plurality of candidate EASDF entities of a first network based on the SM context creation request message.

According to the disclosure, while roaming, a terminal can simultaneously receive a service provided by a DN connected to a home network and an edge computing service provided by a visited network in one PDU session.

According to the disclosure, a terminal can access an edge computing service through an edge hosting environment (EHE) provided by a visited network while roaming, without creating an additional PDU session.

According to the disclosure, even in case where a private Internet protocol (IP) address is allocated to a terminal in a home public land mobile network (HPLMN), it is possible to provide DNS traffic routing function with a V-EASDF in a VPLMN network.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, the disclosure will be described in detail by explaining various embodiments of the disclosure with reference to the attached drawings.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to provide a clear and consistent understanding of the disclosure. Accordingly, the following description of various embodiments of the disclosure is provided for illustration purpose only and not for the purpose of limiting the disclosure as defined by the appended claims and their equivalents.

Herein, singular forms such as "a," "an," and "the" include plural referents unless the context clearly dictates otherwise. Thus, for example, reference to "a component surface" includes reference to one or more of such surfaces.

Accurate time synchronization between terminals is required in certain applications, such as a smart grid. In such a case, a 5GS may provide time synchronization between terminals.

Figure 1:
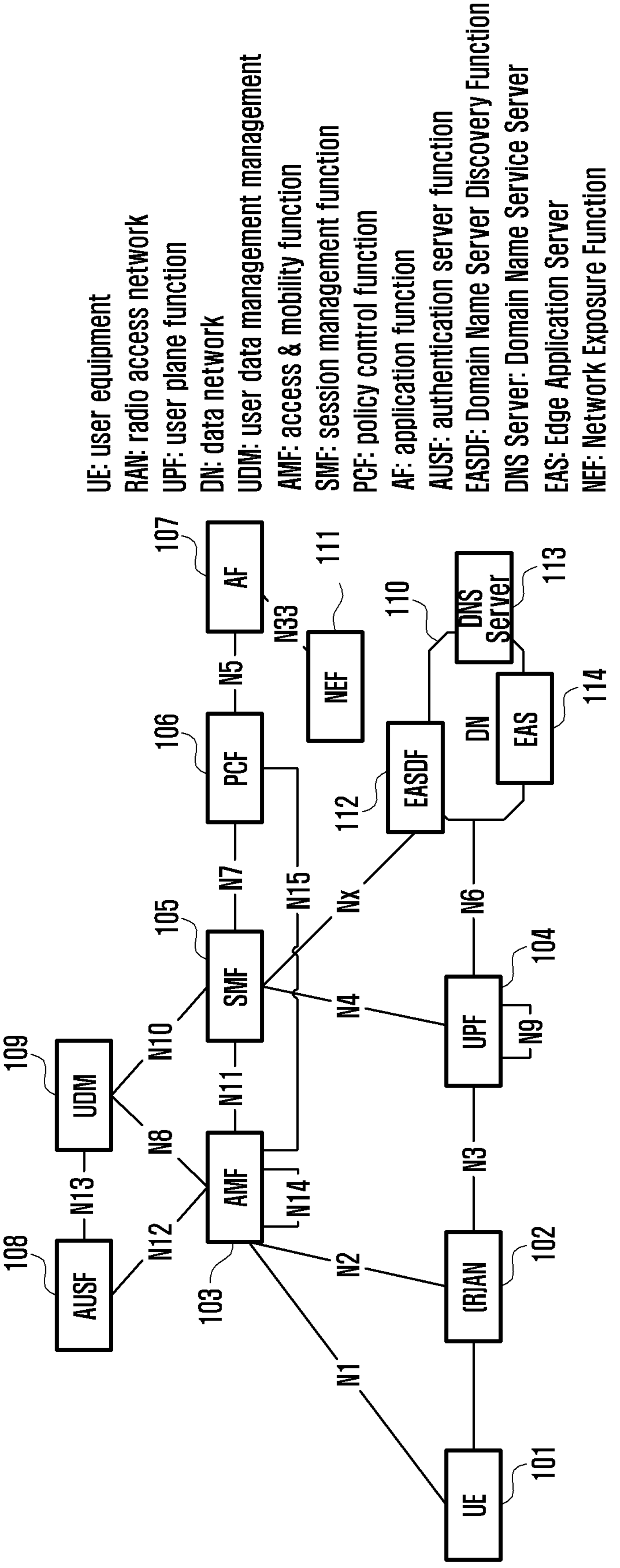
FIG. 1 illustrates a 5G system (5GS) structure expressed as a reference point according to an embodiment.

FIG. 1 illustrates a network structure and interface of a 5GS according to an embodiment.

A network entity included in the network structure of the 5GS of FIG. 1 may include a network function (NF) according to a system implementation.

Referring to FIG. 1, a network structure of a 5GS includes various network entities. For example, the 5GS includes an authentication server function (AUSF) 108, a (core) AMF 103, an SMF 105, a policy control function (PCF) 106, an application function (AF) 107, a unified data management (UDM) 109, a DN 110, a network exposure function (NEF) 113, an edge application service domain repository (EDR) 113, an EAS 114, an EASDF 112, a UPF 104, a (radio) access network ((R)AN) 102, and a terminal, i.e., a UE 101.

Each of the NFs of the 5GS may support the following functions.

The AUSF 108 may process and store data for authentication of the UE 101.

The AMF 103 may provide a function for access and mobility management in units of UEs, and may basically connect to one AMF per UE by default. Specifically, the AMF 103 may support functions, including a signaling between core network (CN) nodes for mobility between third generation partnership projection (3GPP) access networks, termination of a radio access network (RAN) control plane (CP) interface (i.e., an N2 interface), termination of a non-access stratum (NAS) signaling (N1), NAS signaling security (NAS ciphering and integrity protection), access stratum (AS) security control, registration management (registration area management), connection management, idle mode UE reachability (including control and performance of paging retransmission), mobility management control (subscription and policy), support for intra-system mobility and inter-system mobility, support for network slicing, SMF selection, lawful intercept (LI) (for AMF events and interfaces to an LI system), providing delivery of SM messages between the UE and SMF, a transparent proxy for SM message routing, access authentication, access authorization including roaming permission check, providing delivery of SMS messages between the UE and the SMF, a security anchor function (SAF), and/or security context management (SCM), etc. Some or all of functions of the AMF 103 may be supported within a single instance of one AMF.

For example, the DN 110 may refer to an operator service, Internet access, a 3rd party service, etc. The DN 110 may transmit a downlink (DL) PDU to the UPF 104 or receive a PDU transmitted from the UE 101 from the UPF 104.

The PCF 106 may receive information on packet flow from an application server and provide a function of determining policies, such as mobility management and SM. Specifically, the PCF 106 may support functions of, e.g., supporting a unified policy framework to control network behavior, providing policy rules so that control plane function(s) (e.g., AMF, SMF, etc.) may enforce the policy rules, and implementing a front end for accessing relevant subscription information for policy determination in a user data repository (UDR).

The SMF 105 may provide an SMF, and in case where the UE has a plurality of sessions, each session may be managed by a different SMF. Specifically, the SMF 105 may support functions, including SM (e.g., session establishment, modification, and release including tunnel maintenance between the UPF 104 and the (R)AN 102 nodes, UE IP address allocation and management (optionally with authentication), selection and control of UP functions, traffic steering configuration for routing traffic to appropriate destinations in the UPF 104, termination of interfaces towards PCFs, enforcement of policies and control portions of quality of service (QoS), LI (for SM events and interfaces to the LI system), termination of a SM portion of a NAS message, DL data notification, an initiator of access network (AN) specific SM information (transferred to the (R)AN 102 through the N2 via the AMF 103), determination of a session and service continuity (SSC) mode of a session, a roaming function, etc. Some or all of functions of the SMF 105 may be supported within a single instance of one SMF.

The UDM 109 may store user subscription data, policy data, etc. The UDM 109 may include two portions, i.e., an application front end (FE) and a UDR.

The FE may include a UDM-FE in charge of location management, subscription management, and credential processing and a PCF in charge of policy control. The UDR may store data required for the functions provided by the UDM-FE and a policy profile required by the PCF. The data stored in the UDR may include user subscription data and policy data, the user subscription data including a subscription ID, a security credential, access and mobility-related subscription data, and session-related subscription data. The UDM-FE may access the subscription information stored in the UDR and support functions, such as authentication credential processing, user identification handling, access authentication, registration/mobility management, subscription management, SMS management.

The UPF 104 may deliver a DL PDU received from the DN 110 to the UE 101 via the (R)AN 102 and a UL PDU received from the UE 101 to the DN 110 via the (R)AN 102. Specifically, the UPF 104 may support functions, including an anchor point for intra/inter radio access technology (RAT) mobility, an external PDU session point of interconnection to a data network, packet routing and forwarding, a user plane part of packet inspection and policy rule enforcement, LI, a traffic usage report, a UL classifier for supporting traffic flow routing to a data network, a branching point for supporting a multi-homed PDU session, QoS handling for a user plane (e.g., packet filtering, gating, UL/DL rate enforcement), UL traffic verification (service data flow (SDF) mapping between an SDF and a QoS flow), transport level packet marking in UL and DL, DL packet buffering, DL data notification triggering, etc. Some or all of functions of the UPF 104 may be supported within a single instance of one UPF.

The AF 107 may interwork with a 3GPP CN to provide services (e.g., functions, such as impact of an application on traffic routing, access to network capability exposure, interworking with policy frameworks for policy control, are supported).

The (R)AN 102 may collectively refer to a new radio access network that supports both evolved E-UTRA (E-UTRA), which is an evolved version of 4G RAT, and a new radio (NR) access technology (e.g., a gNB).

A gNB may support functions, including functions for radio resource management (i.e., radio bearer control, radio admission control, connection mobility control, dynamic allocation of resources to a UE via UL/DL (i.e., scheduling), IP header compression, encryption and integrity protection of a user data stream, selection of the AMF upon attachment of a UE in case of routing to the AMF is not determined from information provided to the UE, user plane data routing to the UPF(s), a control plane information routing to the AMF, connection setup and release, scheduling and transmission of paging messages (generated from the AMF), scheduling and transmission of system broadcast information (generated from the AMF or operating and maintenance (O&M)), measurement and measurement reporting configuration for mobility and scheduling, transport level packet marking in UL, SM, support for network slicing, QoS flow management and mapping to data radio bearers, support of UE in inactive mode, a NAS message distribution function, a NAS node selection function, a radio access network sharing, dual connectivity, and tight interworking between NR and E-UTRA).

The UE 101 may be referred to as a terminal, a mobile equipment (ME), a mobile station (MS), etc. In addition, the UE 101 may be a portable device, such as a laptop, a mobile phone, a personal digital assistant (PDA), a smartphone, or a multimedia device, or may be a non-portable device, such as a personal computer (PC) or a vehicle-mounted device.

The NEF 111 may provide a means for securely exposing services and capabilities provided by 3GPP network functions for third party, e.g., internal exposure/re-exposure, application functionality, or edge computing. The NEF 111 may receive information (based on exposed capability (capabilities) of other NF(s)) from the other NF(s). The NEF 111 may store the received information as structured data by using a standardized interface to a data storage network function. The stored information may be re-exposed to the other NF(s) and AF(s) by the NEF 111 and used for other purposes, such as analysis.

The EASDF 112 may be an NF that may add, for each fully qualified domain name (FQDN), an edge computing server (ECS) option that may be expressed as an address of a DNS server to which a DNS request is to be forwarded from a UE and as an IP subnet address that may be added when forwarding the DNS request by the UE. The EASDF 112 may receive DNS handling rules from the SMF 105 and process the DNS request message received from the UE according to the received information. In addition, the EASDF 112 may be an NF that performs functions of receiving, from the SMF 105, a UE IP address, location information of the UE 101 in 3GPP, a DNS message handling rules, and DNS message reporting rules, processing a DNS query message received from the UE 101 and a DNS response message received from the DNS server, and transmitting, to the SMF 105, information in the DNS message and statistic information obtained by processing the information, according to the DNS message reporting rules.

For clarity of explanation, the NF repository function (NRF) is not illustrated in FIG. 1, but all NFs illustrated in FIG. 1 may perform interworking with the NRF as needed.

The NRF may support a service discovery function. The NRF may receive an NF discovery request from an NF instance and provide information about the found NF instance to the NF instance. In addition, the NRF may maintain available NF instances and services supported by the NF instances.

For convenience of explanation, a reference model for a case in which the UE 101 accesses one DN 110 by using one PDU session is illustrated in FIG. 1, but the disclosure is not limited thereto.

The UE 101 may simultaneously access two (i.e., local and central) data networks by using a plurality of PDU sessions. In this case, two SMFs may be selected for PDU sessions that are different from each other. However, each of the SMFs may have a capability to control both a local UPF and a central CP function (CPF) within the PDU session.

In addition, the UE 101 may simultaneously access two (i.e., local and central) data networks provided within a single PDU session.

In a 3GPP system, a conceptual link connecting between NFs in the 5GS is defined as a reference point. For example, reference point(s) included in the 5GS of FIG. 1 include:

N1: reference point between the UE 101 and the AMF 103
N2: reference point between (R)AN 102 and AMF 103
N3: reference point between (R)AN 102 and UPF 104
N4: reference point between SMF 105 and UPF 104
N5: reference point between PCF 106 and AF 107
N6: reference point between UPF 104 and DN 110
N7: reference point between SMF 105 and PCF 106
N8: reference point between UDM 109 and AMF 103
N9: reference point between two core UPFs 104
N10: reference point between UDM 109 and SMF 105
N11: reference point between AMF 103 and SMF 105
N12: reference point between AMF 103 and AUSF 108
N13: reference point between UDM 109 and AUSF 108
N14: reference point between 2 AMFs 103
N15: reference point between PCF and AMF in case of non-roaming scenario, and reference point between PCF in visited network and AMF in roaming scenario
Nx: reference point between SMF 105 and EASDF 112

Figure 2:
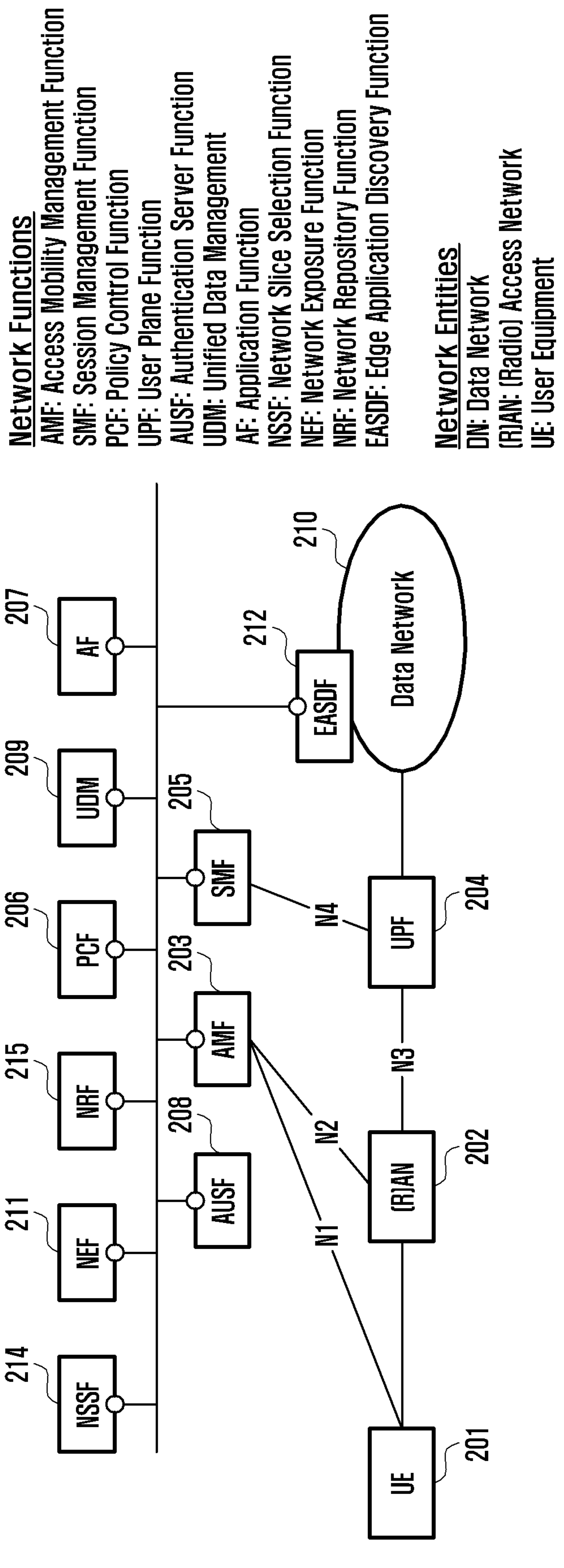
FIG. 2 illustrates a service-based 5GS according to an embodiment.

FIG. 2 illustrates a network structure of a service-based 5GS according to an embodiment.

Referring to FIG. 2, a 5GS 200 includes UE 201, (R)AN 202, AMF 203, UPF 204, SMF 205, PCF 206, AF 207, AUSF 208, UDM 209, DN 210, NEF 211, EASDF 212, EDR 213, network slicing selection function (NSSF) 214, and NRF 215.

The UE 201, (R)AN 202, AMF 203, UPF 204, SMF 205, PCF 206, AF 207, AUSF 208, UDM 209, DN 210, NEF 211, EASDF 212, and EDR 213 in FIG. 2 may perform the same functions as the UE 101, (R)AN 102, AMF 103, UPF 104, SMF 105, PCF 106, AF 107, AUSF 108, UDM 109, DN 110, NEF 111, EASDF 112, and EDR 113 in FIG. 1.

The NSSF 214 may select a set of network slice instances serving the UE 201. In addition, the NSSF 214 may determine granted network slice selection assistance information (NSSAI) and when necessary, perform mapping on subscribed single-NSSAI (S-NSSAI). In addition, the NSSF 214 may determine configured NSSAI, and when necessary, perform mapping on the subscribed S-NSSAI. In addition, the NSSF 214 may determine an AMF set used to service the UE, or determine a list of candidate AMFs by inquiring the NRF 215 according to a configuration.

The NRF 215 may support a service discovery function. The NRF 215 may receive an NF discovery request from an NF instance and provide information about the found NF instance to the NF instance. In addition, the NRF 215 may maintain available NF instances and services supported by the NF instances.

Figure 3:
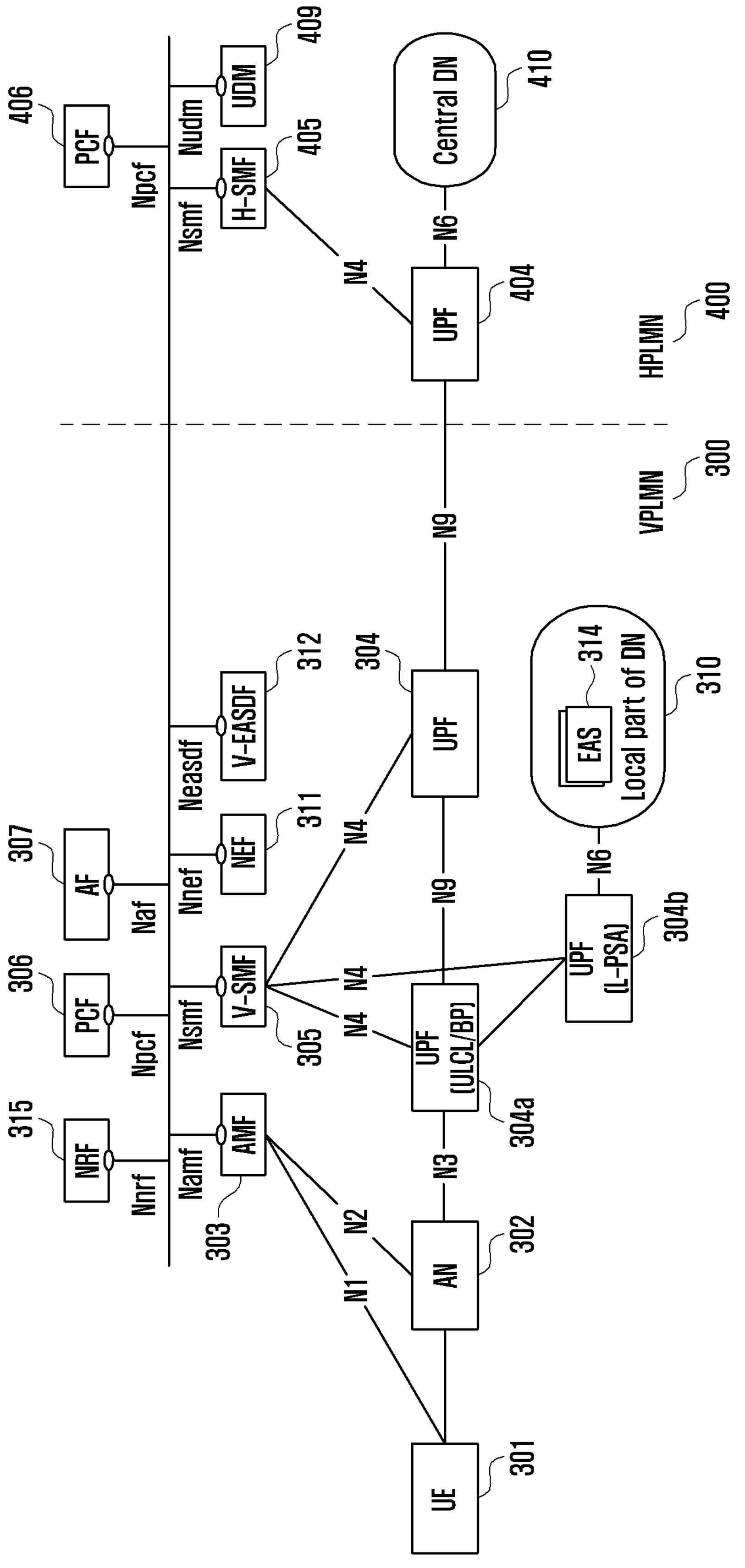
FIG. 3 illustrates a roaming structure of a service-based 5GS that provides HR-SBO in a roaming situation according to an embodiment.

FIG. 3 illustrates a network structure supporting a ULCL/BP UPF for HR-SBO in a home routed roaming scenario according to an embodiment.

Compared to FIG. 2, NFs in the visited network and NFs in the home network, which require further explanation, will be described with reference to FIG. 3.

Referring to FIG. 3, the visited network 300 includes an AMF 303, a V-SMF 305, a V-UPF 304, a V-EASDF 312, and a visited DNS server 310.

The AMF 303 may exist in the visited network 300. The AMF 303 may receive and store a visited SBO allowed indicator from a UDM during a registration procedure of the UE 301. If the AMF 303 identifies the request for DNN/S-NSSAI transmitted by the UE 301 in a PDU session creation procedure, the AMF 303 may transmit the visited SBO allowed indicator to the V-SMF 305. Since a request for an HR session is transmitted, the AMF 303 may transmit the address and/or ID of the home SMF (H-SMF) 305.

The V-SMF 305 may perform tunnel management on a home UPF (H-UPF) 404 through the visited UPF 304. V-SMF 305 may determine the session breakout (ULCL/BP) in the visited network 300 and manages the UP session for local PDU session anchor (L-PSA) UPF 304*b*, ULCL/BP UPF 304*a*, and V-UPF 304 through N4. The V-SMF 305 may deliver HR-SBO support-related information to the H-SMF 405 in order to perform add/change/delete event for a local UPF. The V-SMF 305 is an NF that manages the session of the UE 301 in the visited network 300. If the UE 301 requests creation of a PDU session, the V-SMF 305 may receive a request message requesting for creation of a PDU session from the AMF 303. The V-SMF 305 may receive a request message including the HR-SBO allowed indicator and IDs/addresses of the H-SMF 405 from the AMF 303. The V-SMF 305 receives the HR-SBO allowed indicator from the AMF 303, and in case of a home routed session, in case where the V-SMF 305 receives the H-SMF ID/IP address from the AMF 303, the V-SMF 305 may transfer a request message for HR session creation to the H-SMF 405. The V-SMF 305 may include an indicator requesting to provide the HR-SBO (or an indicator indicating that HR-SBO function is supported) in the request message for HR session creation and transfer the request message to the H-SMF 405. The V-SMF 305 may deliver the address of the V-EASDF 312 (visited DNS server address) to the H-SMF 405. The V-SMF 305 may transmit the routing rule for a local DN (LDN) to the H-SMF 405. The V-SMF 305 may determine whether to add/change/delete the ULCL/BP 304*a*, local UPF 304*b*. In case where the V-SMF 305 adds the ULCL UPF 304*b*, the V-SMF 305 may report the network address for the LDN to be forwarded to the local UPF 304*a* to the H-SMF 405. The H-SMF 405 of the home PLMN 400 may be responsible for packet forwarding of the HR session.

The V-UPF 304 may be an NF that serves to transmit traffic occurring within the visited network 300 to the H-UPF 404. In case where the UE 301 is in idle state, the V-UPF 304 may perform DL data packet buffering. The V-UPF 304 may perform packet forwarding function through an N9 tunnel with the H-UPF 404. The V-UPF 304 may support the ULCL/BP UPF 304*a* or local UPF 304*b* functions together or may exist independently. The V-UPF 304 may be provided in a form in which the ULCL/BP UPF 304*a* or local UPF 304*b* is separated.

The L-PSA UPF 304*b* may be a NF that performs a local PSA UPF function. The L-PSA UPF 304*b* may be connected to the local part of DN 314 through N6. The L-PSA UPF 304*b* may perform functions of forwarding the packets transmitted and received between the UE 301 and EAS 314 of the visited network 300.

The ULCL/BP UPF 304*a* may be an UPF that branches the PDU. The ULCL/BP UPF 304*a* may receive a packet forwarding rule corresponding to the ULCL from the V-SMF 305, and branch and forward the packets, received from the UE 301, to the UPF 304 through the destination address of the UE 301 or the IPv6 prefix of the UE 301.

The V-EASDF 312 may perform an EAS discovery function in the visited network 300. The V-EASDF 312 located in the visited network 300 may be connected to the V-SMF 305. The V-EASDF 312 may receive the DNS message handling rules for the session level and node level from the V-SMF 305. The address of the V-EASDF 312 may be used as a DNS address transferred to the UE 301 as a protocol configuration option (PCO) when a PDU session is created or changed. The home DNS server address may be delivered to the V-EASDF 312 through a message handling rule for the DNS query from the V-SMF 305. The DNS message handling rule may be used as the DNS server address for forwarding the DNS query of the V-EASDF 312 to allow the DNS query to be transmitted to the DNS server of the home network 400 for resolution of the IP address for the FQDN included in the DNS query transmitted from the UE 301 that is not registered in the local network. Alternatively, the DNS message handling rule may be used as a default DNS server address. The DNS message handling rule may exist in the LDN. In a specific implementation, a structure in which the V-UPF 304 and EASDF 312 may be collocated is also possible.

The NFs that provide functions for HR-SBO session in the home network 400 may include a UDM 409, an H-SMF 405, an H-UPF 404, and a home PCF (H-PCF) 406 and a home DNS server 410.

The H-PCF 406 may determine the policy for the home routed session. The H-PCF 406 may perform the function of storing and managing the roaming offloading policy for each VPLMN for the HR-SBO session for each VPLMN according to the service level agreement between operators between the HPLMN 400 and the VPLMN 300. The roaming offloading policy for each VPLMN may include information for routing traffic to the local part of DN 314 within the visited network 300, such as IP address range, domain address range, and QoS and charging policy information for the local part of DN 314 (e.g., session aggregate maximum bit rate (AMBR) information for the local part of DN 314).

The UDM 409 may store a subscriber policy for SM according to a previous roaming agreement between the HPLMN 400 and the VPLMN 300. This subscriber policy may include policies such as whether to allow HR-SBO for each DNN/S-NSSAI of the UE 301 and roping off-route for each VPLMN. The UDM 409 may deliver whether to allow the HR-SBO to the AMF 303 during registration through the visited network 300 of the UE 301. The UDM 409 may deliver whether the HR-SBO is allowed to the AMF 303 upon registration through the visited network 300 of the UE 301. Whether or not the HR-SBO is allowed is separate from a local break out (LBO) allowed indicator, and in case where LBO allowance is configured, the HR-SBO may be configured not to be allowed.

The H-SMF 405 may receive the SM-related subscriber information stored in the UDM 409 and finally determine whether to support the HR-SBO. When the H-SMF 405 allows the HR-SBO, the H-SMF 405 may transmit an HR-SBO use allowed indicator. Alternatively, the DNS server address of the PCO message transferred to the UE 301 may be configured as the address of the V-EASDF provided by the V-SMF 305. The home SMF 405 may deliver a billing collection request to the V-SMF 305 for collecting billing collection. The V-SMF 305 may collect usage data from the UPF 404 through a user plane reporting rule.

The UE 301 may transmit and receive 5G control plane messages through the AMF 303 and SMF 305. The UE 301 may access the EAS 314 through a PDU session through the UPF 304 through the user plane. The UE 301 may receive the DNS server address from the SMF 305. The UE 301 may transmit the DNS query to the DNS server address.

Figure 4:
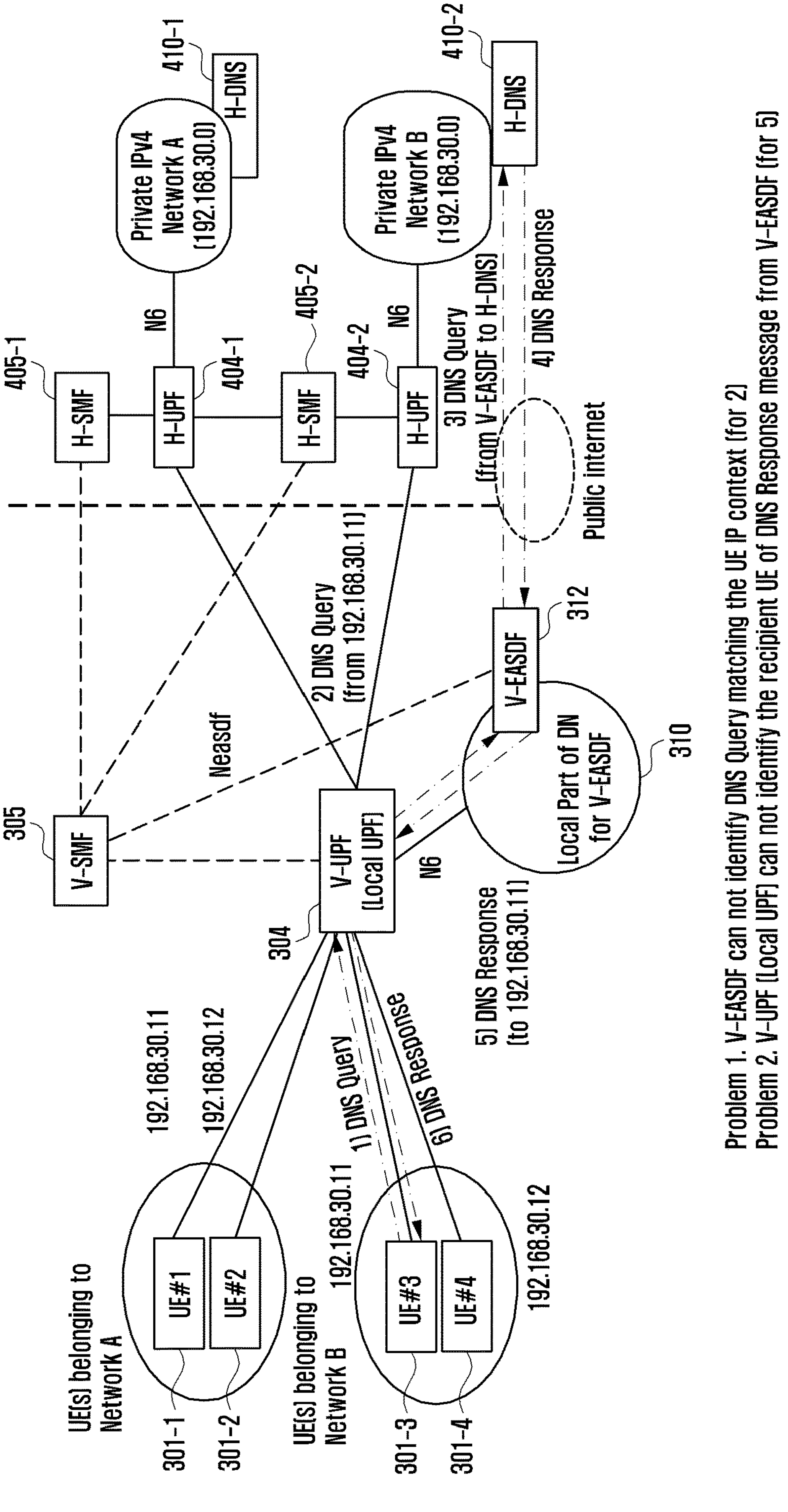
FIG. 4 illustrates problems that occur in case of operating a private IP version 4 (IPv4) network in an HPLMN DN in a wireless communication system according to an embodiment.

FIG. 4 illustrates problems that occur in case of operating a private IPv4 network in an HPLMN DN in a wireless communication system according to an embodiment.

Referring to FIG. 4, in an HPLMN 400, DNs 410-1, 410-2 may be constituted using a private IPv4 network.

A PDU session that applies HR-SBO to a PDU session provided with the home routing constituted in this way may be created. The HR-SBO session is a method for providing local routing in the VPLMN 300 by constituting the ULCL/BP UPF 304*a* and local UPF 304*b* in the VPLMN 300.

In order to use the HR-SBO function in the VPLMN 300 and add/change the local UPF 304*b* of the VPLMN 300, the V-EASDF 312 may be introduced in the VPLMN 300. In case of introducing the V-EASDF 312, the DNS address used by the UEs 301-1, 301-2, 301-3, and 301-4 for the PDU session supporting the HR-SBO is configured to the V-EASDF 312, the UEs 301-1, 301-2, 301-3, and 301-4 use the V-EASDF address as the address of the DNS server and transmits a DNS Query to the V-EASDF 312. The V-EASDF 312 may configure the DNS server address to forward the DNS Query according to the IP addresses of the UEs 301-1, 301-2, 301-3, and 301-4, locations of the UE 301-1, 301-2, 301-3, and 301-4, and a DN access ID (DNAI), for the DNS Query transmitted by the UEs 301-1, 301-2, 301-3, and 301-4. In addition, in case of providing the HR-SBO, when the DNS Query does not correspond to the edge computing service provided by the VPLMN 300, the V-EASDF 312 should forward the DNS Query to the DNS server provided by the HPLMN 400.

In the network structure for providing such HR-SBO, when the HPLMN 400 operates an IPv4 private network, the following problems may occur.

When the DNS Query (Message 2) transmitted by the UEs 301-1, 301-2, 301-3, and 301-4 reaches the V-EASDF 312, a problem may arise in which the V-EASDF 312 cannot identify an appropriate DNSContext using only the IP addresses of the UE 301-1, 301-2, 301-3, and 301-4.

When the V-EASDF 312 transmits a DNS response message (Message 5) to the UEs 301-1, 301-2, 301-3, and 301-4, a problem may arise in which the local UPF **304*b* may not identify the UEs 301-1, 301-2, 301-3, and 301-4** through a destination IP address.

Figure 5:
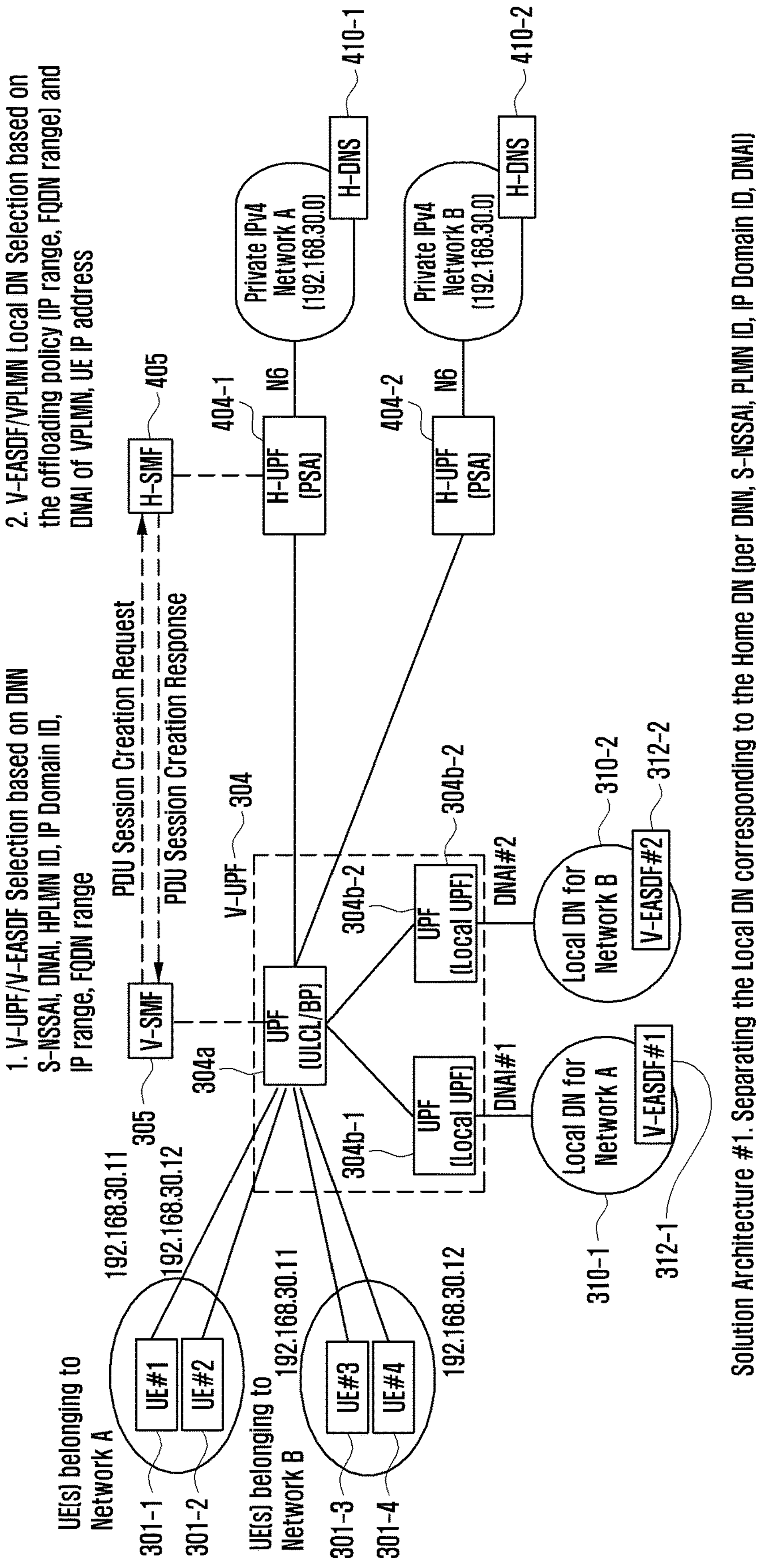
FIG. 5 illustrates a structure for constituting a separate local DN corresponding to a private IPv4 network of an HPLMN in a VPLMN and selecting a constituted local network in a wireless communication system according to an embodiment.

FIG. 5 illustrates a structure for constituting a separate local DN corresponding to a private IPv4 network of an HPLMN in a VPLMN and selecting the constituted local network in a wireless communication system according to an embodiment.

More specifically, FIG. 5 illustrates a method for constituting a separate Local DN corresponding to the private IPv4 network of the HPLMN 400 in the VPLMN 300 and selecting the constituted local network as a method for solving the problem raised in FIG. 4. That is, FIG. 5 is a conceptual diagram illustrating a method for separately constituting a local part of DN network in the VPLMN 300 corresponding to the private network of the HPLMN 400.

Referring to FIG. 5, a separate local part of DN 310-1 corresponding to private IPv4 network A connection provided by the HPLMN 400 is constituted, and the V-EASDF 312-1 may be installed in this network. Likewise, the local part of DN 310-2 corresponding to private IPv4 network B provided by the HPLMN 400 is constituted with a separate network, and V-EASDF #2 312-2 may be installed here.

Since the DNS traffic transmitted and received from the UEs 301-1, 301-2, 301-3, and 301-4 may be independently connected to the independently installed V-EASDFs 312-1 and 312-2 by constituting an independent network in the VPLMN 300, the problem raised in FIG. 4 due to the network constitution may be solved.

In order to independently select local DNs 310-1 and 310-2, local UPFs **304*b*-1 and 304*b*-2, and V-EASDFs 312-1 and 312-2 for each DN 410-1 and 410-2 of the HPLMN 400 and private IP domain, the following method may be performed during a PDU session creation process, so that the local DNs 310-1 and 310-2, local UPFs (V-UPF) 304*b*-1 and 304*b*-2 and V-EASDFs 312-1 and 312-2** may be selected.

1) Method to select from the V-SMF 305: According to the preconfigured information/roaming agreement for each DNN, S-NSSAI, and HPLMN, after receiving a PDU session creation request message from the AMF 303 for SM context creation request for PDU session, and before delivering the message to the H-SMF 405, the V-SMF 305 may select at least one of the local UPFs (V-UPF) **304*b*-1 and 304*b*-2 and V-EASDFs 312-1 and 312-2**.
2) Method to select from the H-SMF 405: The V-SMF 305 may transmit the list of local DN information (e.g., IP address range, DNAI, DNN and S-NSSAI information) and V-EASDF information available in the V-SMF 305 to the H-SMF 405, and select the V-EASDFs 312-1 and 312-2 of the VPLMN 300 corresponding to the IP addresses of the UEs 301-1, 301-2, 301-3, and 301-4 allocated by the H-SMF 405 or local DNs 310-1 and 310-2 that can be provided by the VPLMN 300. An advantage of this method is that, when there is no prior agreement between the VPLMN 300 and the HPLMN 400, the network constitution of the VPLMN 300 is dynamically changed, or the network constitution of the HPLMN 400 is dynamically changed, the local UPFs **304*b*-1 and 304*b*-1 or local DNs 310-1 and 310-2 or V-EASDFs 312-1 and 312-2 of the VPLMN 300 may be dynamically selected based on the information about the network provided by the HPLMN 400 based on the list of local DNs 310-1 and 310-2 of the V-EASDFs 312-1 and 312-2 available from the V-SMF 305 and the IP addresses of the UEs 301-1, 301-2, 301-3, and 301-4. In order to provide this method, the V-SMF 305 may deliver the information about the network constitution for the V-EASDFs 312-1 and 312-2 to the H-SMF 405 and the H-SMF 405 may select at least one of the network constitutions for a plurality of the V-EASDFs 312-1 and 312-2**.

Figure 6:
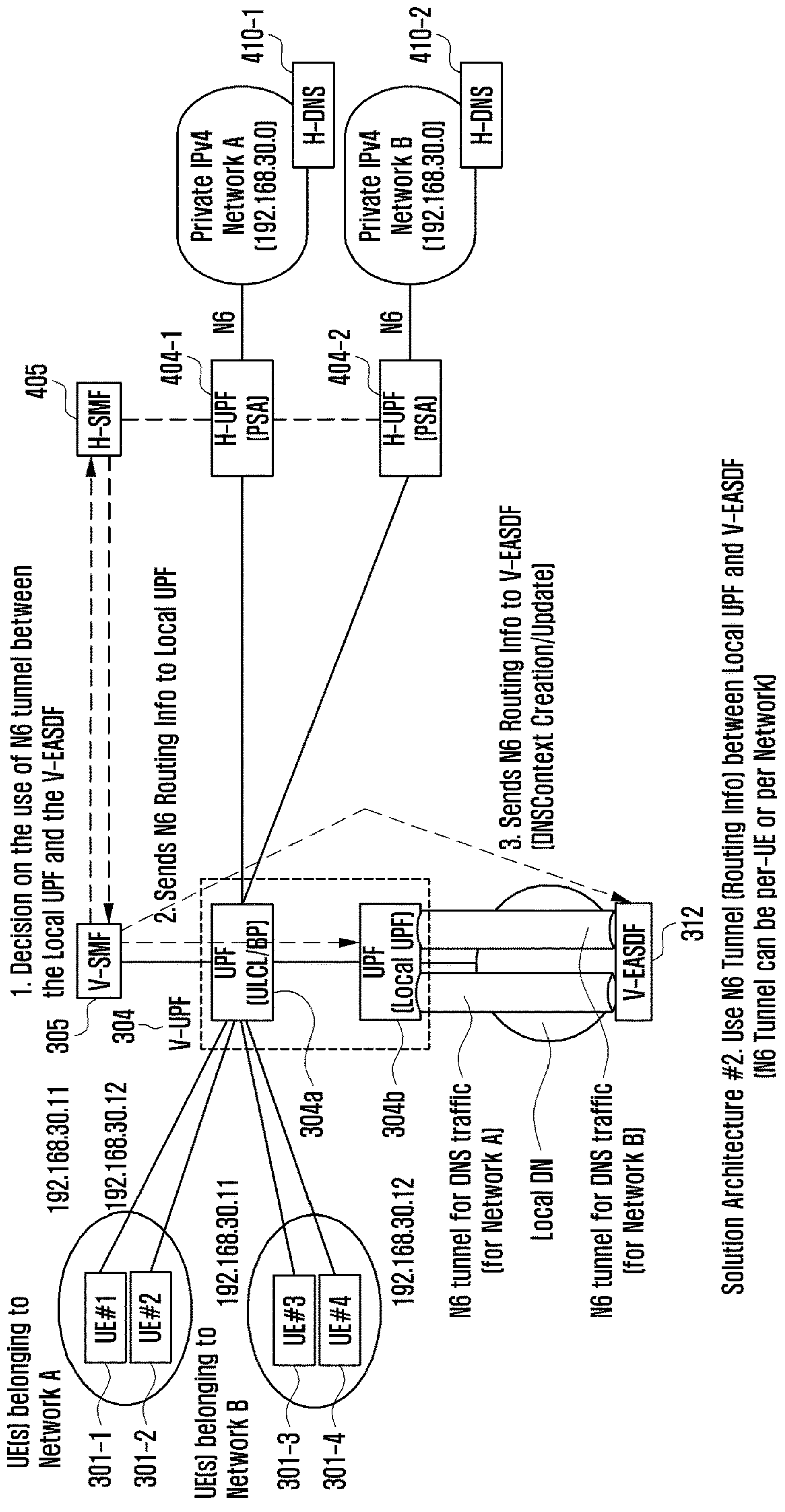
FIG. 6 illustrates an operation of routing DNS traffic using an N6 tunnel between a V-EASDF and a VPLMN UPF in a wireless communication system according to an embodiment.

FIG. 6 illustrates an operation of routing DNS traffic using an N6 tunnel between a V-EASDF and a VPLMN UPF in a wireless communication system according to an embodiment.

Referring to FIG. 6, as a second method for solving the problem raised in FIG. 4, a method for creating an N6 tunnel between the V-EASDF 312 and the UPF 304 in the VPLMN 300, and routing DNS traffic by distinguishing the IP addresses allocated by the home private network 400 will be described.

For transmission and reception of DNS traffic between the local DN 310 to which the V-EASDF 312 belongs and the UEs 301-1, 301-2, 301-3, and 301-4, the ULCL/BP UPF **304*a* and local UPF 304*b* may be used. Alternatively, in FIG. 6, the V-UPF 304 may be constituted to include the ULCL/BP UPF 304*a* and local UPF 304*b***.

In order to route DNS traffic between the UEs 301-1, 301-2, 301-3, and 301-4 and the V-EASDF 312 in the V-SMF 305, it is determined whether to use the N6 tunnel between the local UPF **304*b* and the V-EASDF 312. In case of creating the N6 tunnel, N6 tunnel information may be exchanged to deliver the DNS traffic between the local UPF 304*b* and the V-EASDF 312. The N6 tunnel information may be identified for the N6 tunnel between the local UPF 304*b* and the V-EASDF 312 for each network, and may be identified for each of UEs 301-1, 301-2, 301-3, and 301-4**.

For the DNS traffic routing, the V-SMF 305 may transmit an N4 rule for DNS traffic separation to the ULCL/BP **304*a*. The V-SMF 305** may transmit N4 rules for receiving the DNS traffic.

The PDU session requested by the UEs 301-1, 301-2, 301-3, and 301-4 from the H-SMF 405 is an HR-SBO session, and when the DNs 410-1 and 410-2 of the HPLMN 400 utilize a private network, and the N6 tunnel is used between the local UPF 304*b* and the V-EASDF 312, the V-SMF 305 may determine to utilize routing using the N6 tunnel.

When the V-SMF 305 determines to use the N6 tunnel between the local UPF (V-UPF) 304*b* and the V-EASDF 312, the V-SMF 305 may deliver information about the N6 tunnel to the local UPF (V-UPF) 304*b* and V-EASDF 312, respectively.

Figure 7A:
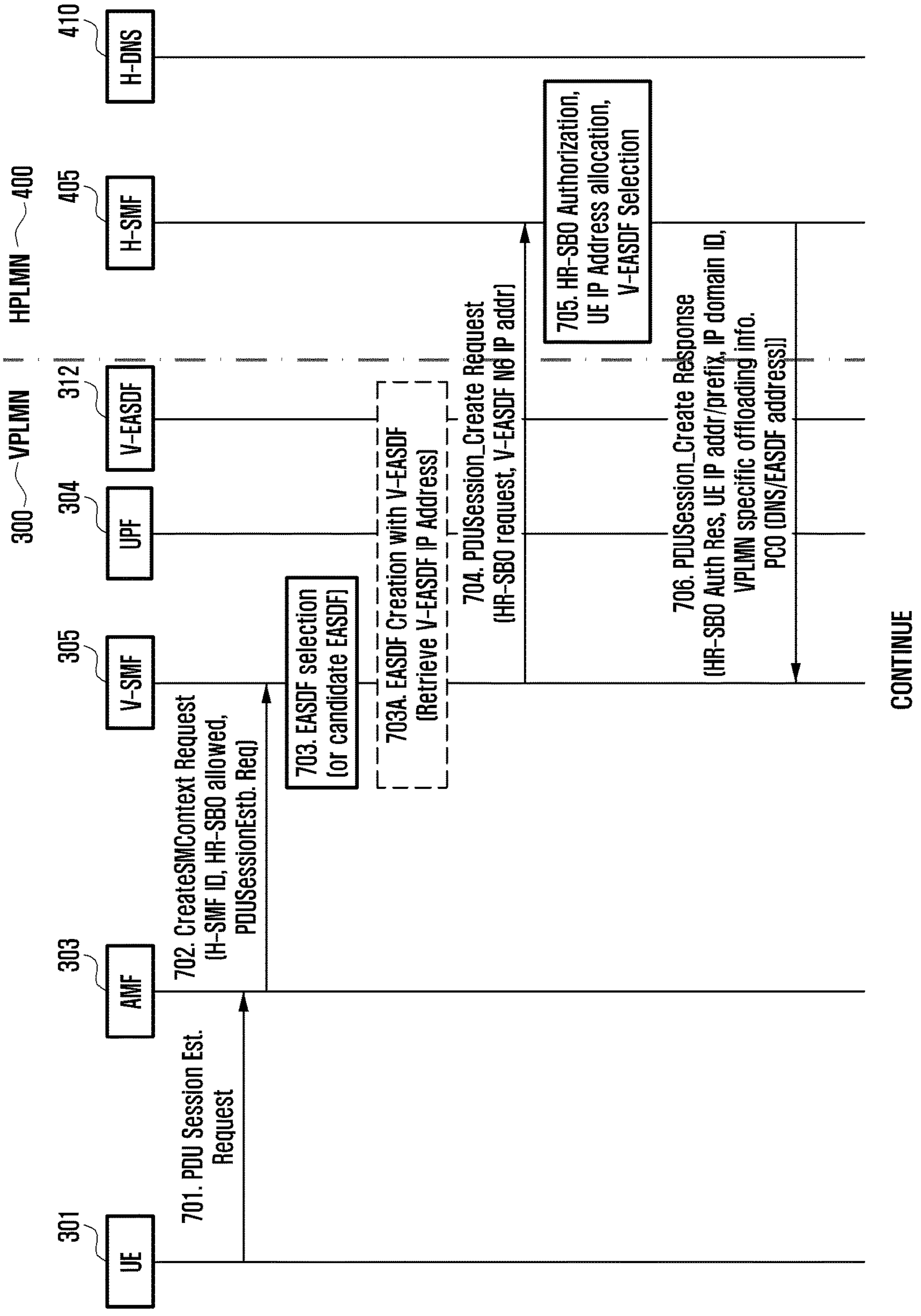
FIGS. 7A and 7B are signal flow diagrams illustrating a procedure for configuring DNS traffic routing while creating a home routed PDU session capable of session breakout in a wireless communication system according to an embodiment.
Figure 7B:
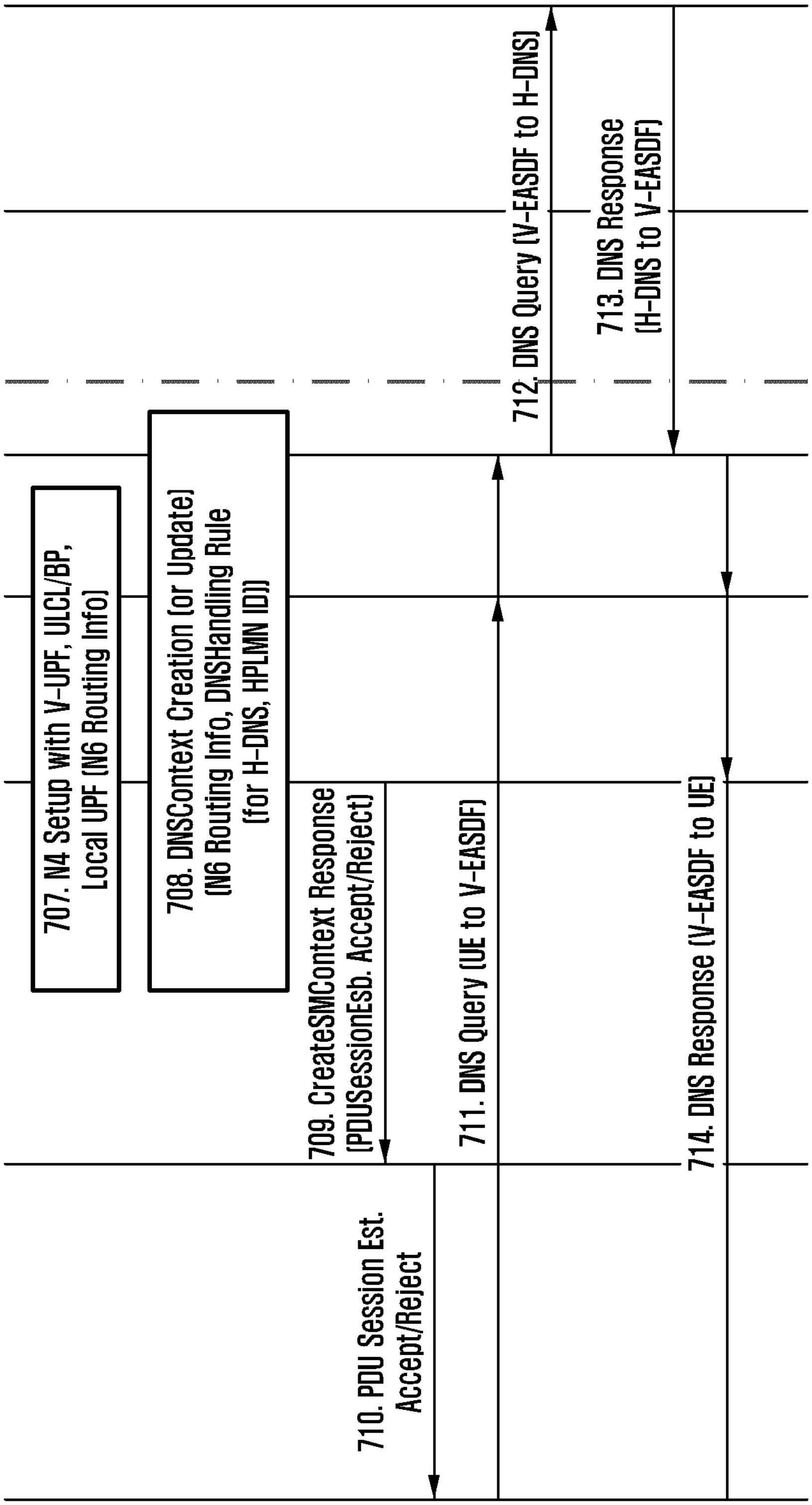

FIGS. 7A and 7B are signal flow diagrams illustrating a procedure for configuring DNS traffic routing while creating a home routed PDU session capable of session breakout in a wireless communication system according to an embodiment.

More specifically, FIGS. 7A and 7B illustrate a procedure for configuring DNS traffic routing in a procedure for creating a home routed PDU session capable of session breakout. In FIG. 7, a method for configuring an independent network and a method for using the N6 tunnel (e.g., as illustrated in FIG. 5) may be used together or may be used as separate methods, respectively.

Referring to FIG. 7A, in step 701, the UE 301 transmits, to the AMF 303, a PDU session creation request message requesting to create a PDU session. The AMF 303 may receive the PDU session creation request message requesting to create a PDU session from the UE 301. The UE 301 may create the PDU session creation request message based on UE route selection policy (URSP) information received after a registration procedure, local configuration within the UE 301, or a request from an application.

In step 702, the AMF 303 transmits an SM context creation request message (CreateSMContext Request) to the V-SMF 305. The V-SMF 305 may receive the SM context creation request message from the AMF 303. Based on the PDU session creation request message received from the UE 301, the AMF 303 may identify subscriber information of the UE 301, whether HR-SBO and LBO are allowed for DNN and S-NSSAI information requested by the UE 301. In case where LBO is allowed, the AMF 303 may determine the LBO and select the V-SMF 305 that supports the LBO. The AMF 303 selects the home routed session of the PDU session requested by the UE 301, and in case where it is a home routed session, the AMF 303 may identify whether HR-SBO is allowed. When the session requested by the UE 301 is the home routed session and the HR-SBO is allowed, the AMF 303 may select the V-SMF 305 that supports the HR-SBO and may transmit, to the V-SMF 305, information that identifies the H-SMF 405 for home routing (H-SMF ID or H-SMF address) and an indicator indicating whether the HR-SBO is allowed. The AMF 303 may store in advance the ID of the H-SMF 405 or address of the H-SMF 405 for the home operator network of the UE 301. The AMF 303 may transmit, to the V-SMF 305, an SM context creation request (PDU Session CreateSMContext Request message) for creating a PDU session for a home routed session. The AMF 303 may determine to allow SBO for the HR session in case where there is a visited SBO allowed indicator in the subscriber information of the home operator corresponding to the DNN and S-NSSAI included in the PDU session request message requested by the UE 301. In case where the SBO is allowed, the AMF 303 may transmit, to the V-SMF 305, a request message including a UE subscription ID, an address or ID of the H-SMF 405, a visited session break out (VSBO) allowed indicator, DNN and S-NSSAI information in an SMContext creation request message. The V-SMF 305 may determine the creation of the HR session and provision of session breakout for the HR session, based on the HR-SBO allowed indicator included in the PDU session SMContext creation request message received from the AMF 303 and information related to the H-SMF 405 (i.e., an ID of the H-SMF 405, or an address of the H-SMF 405).

In step 703, when the V-SMF 305 receives the HR-SBO allowed indicator, it may select one V-EASDF 312 or a plurality of candidate V-EASDFs (EASDF selection (or candidate EASDF)).

In step 703A, the V-SMF 305 may perform a procedure for creating an EASDF with the V-EASDF 312 (EASDF Creation with V-EASDF (Retrieve V-EASDF IP Address)). The V-SMF 305 may select the local UPF (V-UPF) 304 and V-EASDF 312 based on information configured in advance for each DNN, S-NSSAI, and HPLMN or information configured according to a roaming agreement.

The V-SMF 305 may transmit, to the H-SMF 405, configuration information (e.g., IP address range, DNAI, DNN and S-NSSAI information) on the local DN candidates for connection to the V-EASDF 312 and a list of candidate V-EASDFs, for the HR-SBO session provided by the VPLMN network 300.

When the V-SMF 305 selects the V-EASDF 312 corresponding to the address to be transmitted to the H-SMF 405, the V-EASDF 312 may transmit, to the selected V-EASDF 312, a request to obtain the N6 IP address of the V-EASDF 312 accessible from the UE 301. The V-SMF 305 may transmit the N6 IP address of the V-EASDF 312 obtained from the selected V-EASDF 312 to the H-SMF 405.

In step 704, if the V-SMF 305 determines to provide an HR session, it may transmit a PDU session creation request message (PDUSession_Create Request) to the H-SMF 405 corresponding to the H-SMF ID or address received from the AMF 303. The PDU session creation request message may include an HR-SBO indicator. The VSBO indicator transmitted from the V-SMF 305 to the H-SMF 405 may indicate that the V-SMF 305 utilizes the ULCL/BP 304*a* to provide session breakout function for the currently requested home routed PDU session.

The visited SMF 305 may interwork with the V-EASDF 312, and configure the address of the V-EASDF 312 interworking with the V-SM F 305 to the DNS server address for the PDU session currently being created by the UE 301 in order to provide the session breakout function corresponding to the EAS discovered through the DNS message of the UE 301. For this purpose, the V-SMF 305 may transmit the address of the V-EASDF 312 (i.e., the DNS server address to be transmitted to the UE 301 as PCO and configured for the PDU session of the UE 301) to the H-SMF 405.

The V-SMF 305 may transmit information for selecting the V-EASDF 312 to the H-SMF 405.

The V-SMF 305 may transmit, to the H-SMF 405, information about local DN for routing DNS traffic for the V-EASDF 312. Information about the local DN corresponding to the V-EASDF 312 transmitted from the V-SMF 305 to the H-SMF 405 may include the IP address of the V-EASDF, DNAI corresponding to the local DN in the VPLMN 300, IP range information in local DN, etc.

In step 705, the H-SMF 405 receives a PDU session creation request from the V-SMF 305 in step 703. The H-SMF 405 may transmit, to the UDM, a request message for obtaining subscriber information for the session. In order to receive information for each VPLMN in a roaming situation, the H-SMF 405 may include the currently serving VPLMN ID information in a subscriber data management (SDM) request message for obtaining subscriber information and transmit the SDM request message to the UDM. The UDM may identify the serving network information (VPLMN ID) of the UE 301, and identify the HR-SBO allowance information and subscription information preconfigured for each VPLMN through the HPLMN 400 and SLA. The UDM may include in the response message an indicator indicating whether or not HR-SBO is allowed for each the VPLMN 300 by DNN and S-NSSAI, or DNN, and in case of allowing the HR-SBO, offloading subscriber policy information for the VPLMN may be additionally included. The subscriber offloading policy information for each VPLMN may include traffic routing information for the local part of DN in the VPLMN 300 that allows routing the traffic of the UE 301 to the local part of DN in the VPLMN 300, for example, local traffic path configuration information such as IP address range, FQDN range, etc. Also, information such as session AMBR, which is subscriber information for the local part of DN, may be additionally included.

The H-SMF 405 may select one of a plurality of V-EASDFs provided by the V-SMF 305. The H-SMF 405 may select the V-EASDF 312 of the VPLMN 300 corresponding to the allocated IP address of the UE 301 or local DN that may be provided by the VPLMN 300. The H-SMF 405 may determine the IP address to be allocated to the UE by considering the V-EASDF information provided by the V-SMF 305 and information about the local DN for V-EASDF interworking. The advantage of this method is that, in case where there is no prior agreement between the VPLMN 300 and the HPLMN 400, the network constitution of the VPLMN 300 is dynamically changed, or the network constitution of the HPLMN 400 is dynamically changed, the local UPF 304 or local DN or V-EASDF 312 of the VPLMN 300 may be dynamically selected based on the information about the network provided by the HPLMN 400 based on the list of V-EASDF local DNs available from the V-SMF 305 and the IP address of the UE 301.

In step 706, the H-SMF 405 identifies whether HR visited SBO is allowed based on the SM subscriber information received from UDM or the roaming agreement agreed upon with the subscriber's serving network. When the use of SBO provided by the visited network 300 is allowed and VSBO is received from the visited SMF 305, the H-SMF 405 may allow the address of the V-EASDF 312 transmitted by the visited SMF 305 to be used as the DNS server address transmitted to the UE 312.

The H-SMF 405 may configure the address of the V-EASDF 312 to the DNS server address to be transmitted to the UE 301, and configure the address of the V-EASDF 312 to the DNS address in a PCO field along with a PDU session allowance message to transmit the same to the UE 301. The H-SMF 405 may transmit a PDU session creation response message to the V-SMF 305. The H-SMF 405 may transmit the result of the HR-SBO request to the V-SMF 305.

When the V-SMF 305 allows the performance of VSBO and transmits the address of the V-EASDF 312 provided by the V-SMF 305 to the PCO as the DNS server address of the UE 301, the H-SMF 405 may transmit the DNS server address of the home network 400, which has been previously intended to be used as the DNS server address of the UE 301, may be transmitted to the V-SMF 305.

The H-SMF 405 uses a private IP address, and in preparation for a case where IP address overlap occurs by using a plurality of private IP addresses within one PLMN, the H-SMF 405 may transmit, to the V-SMF 305, whether the private IP address of the HPLMN 400 is used, or IP private network domain ID that may distinguishes different private IP networks.

When the V-SMF 305 receives DNAI information for distinguishing local DNs provided by a plurality of VPLMNs, the H-SMF 405 may determine the DNAI to be used in the VPLMN 300, based on preconfigured DNAI information, information configured for roaming agreements such as roaming offloading policy, offloading configuration information received from UDM, offloading policy for the VPLMN 300 received from the H-PCF 306, IP address allocated to the UE 301, whether the IP address allocated to the UE 301 is a private IP address.

The H-SMF 405 may transmit the determined DNAI information to the V-SMF 305.

Referring to FIG. 7B, in step 707, the V-SMF 305 performs N4 configuration for the V-UPF 304 (N4 Setup with V-UPF, ULCL/BP, Local UPF (N6 Routing Infor)).

The V-SMF 305 may receive the PDU session creation response message and transmit the N4 rule to the V-UPF 304 to configure N9 tunnel information related to the H-UPF 404. The V-SMF 305 may determine whether to provide HR-SBO based on whether the HR-SBO received from the AMF 303 is allowed for HR-SBO and whether to receive allowance from the H-SMF 405.

In case of determining to provide the HR-SBO, the V-SMF 305 may configure the V-UPF 304 (ULCL/BP UPF **304*a* and local UPF 304*b*) and configure a rule for routing DNS Query from the UE 301 to the V-EASDF 312 to the V-UPF 304**.

Herein, the V-UPF 304 may refer to the UPF 304, which includes the function of the ULCL/BP UPF **304*a*, the function of the local UPF 304*b*, and the function of connecting the N9 tunnel and the UPF 404 of the HPLMN 400, as illustrated in FIGS. 5 and 6. Alternatively, the V-UPF 304 may exist separately by being divided into the ULCL/BP UPF 304*a* and the Local UPF 304*b*, as illustrated in FIGS. 5 and 6**.

The V-SMF 305 may determine to add the ULCL/BP **304*a* and local UPF 304*b* to route traffic to the V-EASDF 312**.

In order to route the DNS traffic to the V-EASDF 312, the V-SMF 305 may select the local UPF **304*b* based on at least one of its own preconfigured information, information configured by a roaming agreement, DNN, S-NSSAI, and HPLMN IDs, which is information included in the roaming offloading policy received from the H-SMF 405, IP address of the UE 301, whether the DN 410 of the HPLMN 400** is a private IP network, an IP private network domain ID that may distinguish private IP networks, and DNAI information.

When adding the ULCL/BP **304*b* and the Local UPF 304*b*, in order to breakout the traffic transmitted from the UE 301 to the V-EASDF 312 to the added ULCL/BP UPF 304*a*, the V-SMF 305 may transmit, to the ULCL/BP UPF 304*a*, packet detection rule (PDR) with the N6 IP address of the selected V-EASDF 312** as a destination address, and packet forwarding rules for the PDR.

As illustrated in FIG. 6, the V-SMF 305 may transmit, to the Local UPF **304*b*, routing information about the N6 tunnel for transmitting and receiving the DNS traffic to and from the V-EASDF 312. The routing information of the N6 tunnel may have different N6 tunnel information for each UE, or may have tunnel information for each network having different tunnel information for each network corresponding to the DN 410 of the HPLMN 400**.

In step 708, the V-SMF 305 creates or updates a DNS context with the V-EASDF 312 (DNSContext Creation (or Update) (N6 Routing Info, DNSHandling Rule (for H-DNS, HPLMN ID)).

The V-SMF 305 may have selected the V-EASDF 312 (step 703) before requesting PDU session creation. Alternatively, the V-SMF 305 may transmit information to select the V-EASDF 312 to the H-SMF 405, and when the H-SMF 405 selects the V-EASDF 312, the V-SMF 305 may receive information related to the selected V-EASDF 312 from the H-SMF 405.

The V-SMF 305 may perform a procedure for configuring DNS context for the selected V-EASDF 312.

The V-SMF 305, which has received the DNS server address of the home network, may create DNS message handling rules to be transmitted to the V-EASDF 312. The V-EASDF 312 may create DNS message rules for each EAS domain based on EAS Deployment Information.

When there is no FQDN rule corresponding to the edge application deployment information (EAS Deployment Info) for the VPLMN 300, the V-SMF 305 may transmit, to the V-EASDF 312, a DNS message handling rule that configures the DNS server address of the home network as a default DNS server address to route the DNS Query to the DNS server 410 of the HPLMN 400.

The V-SMF 305 may receive the IP address of the UE 301, a private network IP network ID, or information indicating whether to use a private network from the H-SMF 405.

The V-SMF 305 may determine to transmit and receive the DNS traffic using the N6 tunnel between the V-EASDF 312 and the local UPF **304*b*. The V-SMF 305 may transmit the N6 tunnel routing information to the V-EASDF 312**.

Alternatively, if the V-SMF 305 has received the HR-VSBO allowed indicator in step 706 from the AMF 303, the V-SMF 305 may determine to provide the HR-SBO without the HR-SBO allowance procedure from the H-SMF 405.

As another alternative, the V-SMF 305 may determine to add the ULCL/BP **304*a* and local UPF 304*b* through its own configuration according to the roaming agreement between the HPLMN 400** and the operator.

In step 709, the V-SMF 305 transmits a response message (CreateSMContext Response) to the AMF 303 for the SM context creation request. The response message may include information indicating the PDU session creation result (acceptance or rejection). The V-SMF 305 may transmit, to the AMF 303, a response message including a PCO value in which the DNS server address included in the PCO value received from the H-SMF 405 is configured to the EASDF server address.

In step 710, the AMF 303 may transmit the PDU session creation result received from the V-SMF 305 to the UE 301.

In step 711, the UE 301 transmits a DNS query message to the V-EASDF 312 through the UPF 304. The V-EASDF 312 may receive a DNS query message from the UE 301 through the UPF 304.

In step 712, the V-EASDF 312 transmits the DNS query message to the H-DNS 410. The H-DNS 410 may receive the DNS query message from the V-EASDF 312.

In step 713, the H-DNS 410 transmits a DNS response message to the V-EASDF 312. The V-EASDF 312 may receive the DNS response message from the H-DNS 410.

In step 714, the V-EASDF 312 transmits the DNS response message to the UE 301 through the UPF 304. The UE 301 may receive the DNS response message from the V-EASDF 312 through the PF 304.

Figure 8:
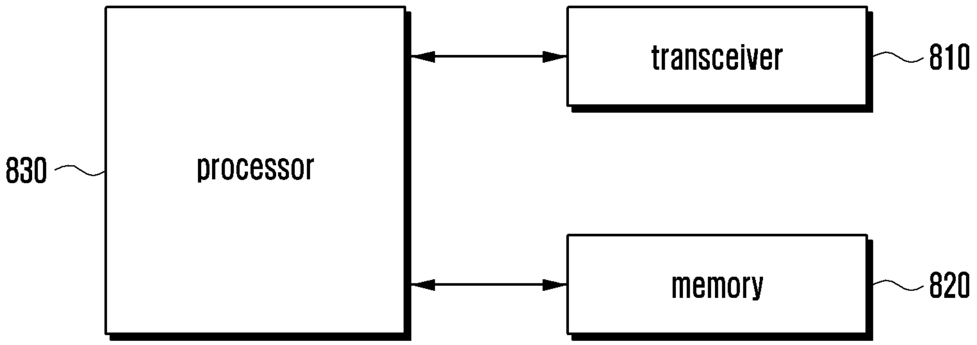
FIG. 8 illustrates a UE according to an embodiment.

FIG. 8 illustrates a UE according to an embodiment.

Referring to FIG. 8, a UE includes a transceiver 810, a memory 820, and a processor 830. The UE may be the same as or similar to the UE 101 in FIG. 1, UE 201 in FIG. 2, UE #1 301-1, UE #2 301-2, UE #3 301-3, or UE #4 301-4 in FIGS. 4 to 6, or UE 301 in FIGS. 7A and 7B.

The processor 830, transceiver 810, and memory 820 of the UE may operate according to the operating method of the UE. The components of the UE are not limited to those in FIG. 8. For example, the UE may include more components or fewer components than the components in FIG. 8. In addition, the processor 830, transceiver 810, and memory 820 may be implemented as a single chip.

The transceiver 810 may collectively refer to a receiver and transmitter of the UE and may transmit and receive signals to and from a base station or a network entity. The signals transmitted and received to and from the base station may include control information and data. For this purpose, the transceiver 810 may include a radio frequency (RF) transmitter for up-converting and amplifying a transmitted signal and an RF receiver for low-noise-amplifying a received signal and down-converting a frequency of the received signal. However, this is merely an embodiment of the transceiver 810, and the components of the transceiver 810 are not limited to the RF transmitter and RF receiver.

Also, the transceiver 810 may include a wired or wireless transceiver and may include various components for transmitting and receiving signals.

The transceiver 810 may receive a signal through a radio channel and output the signal to the processor 830 and may transmit a signal output from the processor 830, through a radio channel.

The transceiver 810 may receive a communication signal and output it to the processor, and transmit the signal output from the processor 830 to a network entity through a wired or wireless network.

The memory 820 may store programs and data necessary for the operation of the UE. Also, the memory 820 may store control information or data included in the signals obtained by the UE. The memory 820 may include a storage medium or a combination of storage media such as read only memory (ROM), random access memory (RAM), a hard disk, a compact disc ROM (CD-ROM), and a digital versatile disc (DVD).

The processor 830 may control a series of processes such that the UE may operate according to the above embodiments of the disclosure. The processor 830 may include one or more processors. For example, the processor 830 may include a communication processor for performing control for communication and an application processor (AP) for controlling an upper layer such as an application program.

The UE according to the disclosure may be at least one of various types of communication nodes. For example, the UE may be a terminal, a base station, or at least one of various network entities used in various communication systems.

Figure 9:
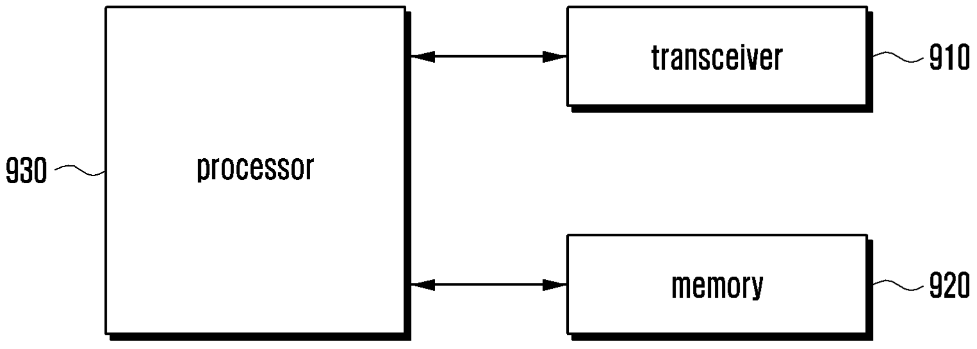
FIG. 9 illustrates a base station according to an embodiment.

FIG. 9 illustrates a base station according to an embodiment.

Referring to FIG. 9, the base station may be at least one of the (R)AN 102 in FIG. 1 or the (R)AN 202 in FIG. 2.

The base station includes a processor 930 that controls the overall operation of the base station 900, a transceiver 910 including a transmitter and a receiver, and a memory 920. The components of the base station are not limited the above examples, and the base station may include more components or fewer components than the components illustrated in FIG. 9.

The transceiver 910 may transmit and receive signals to/from at least one of network entities or UEs. The signals transmitted and received with at least one of the network entities or UEs may include control information and data.

The processor 930 may control the base station to perform the operations of FIGS. 1 to 7 described above. The processor 930, memory 920, and transceiver 910 do not necessarily have to be implemented as separate modules, and may be implemented as one component in the form of a single chip. Also, the processor 930 and the transceiver 910 may be electrically connected.

The memory 920 may store a basic program for operating the base station, an application program, and data such as configuration information. In particular, the memory 920 provides stored data upon request from the processor 930. The memory 920 may include a storage medium or a combination of storage media such as ROM, RAM, a hard disk, CD-ROM, and DVD. Also, a plurality of the memories 920 may be provided. The processor 930 may perform the above described embodiments based on a program for performing the embodiments of the disclosure stored in the memory 920.

Figure 10:
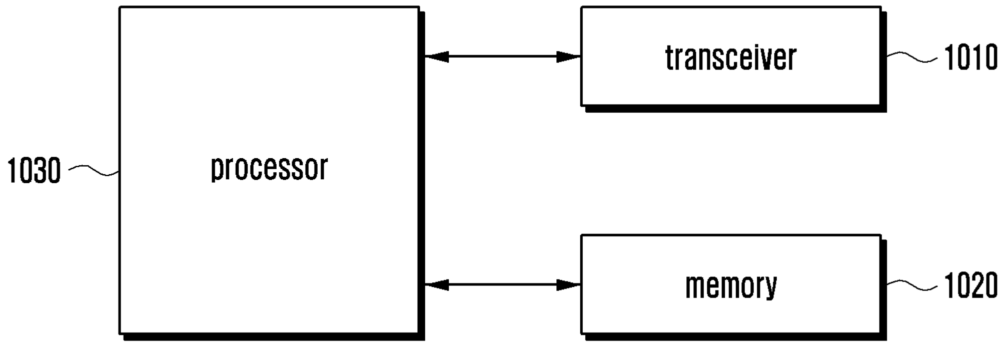
FIG. 10 illustrates a network entity according to an embodiment.

FIG. 10 illustrates a network entity according to an embodiment.

Referring to FIG. 10 the network entity may be at least one of the AMF 103, UPF 104, SMF 105, PCF 106, AF 107, AUSF 108, UDM 109, NEF 111, EASDF 112, DNS 113, or EAS 114 in FIG. 1, the AMF 203, UPF 204, SMF 205, PCF 206, AF 207, AUSF 208, UDM 209, NEF 211, EASDF 212, NSSF 214, or NRF 215 in FIG. 2, the AMF 303, UPF 304, ULCL/BP UPF 304*a*, Local UPF 304*b*, V-SMF 305, PCF 306, AF 307, V-EASDF 312, EAS 314, NRF 315, V-EASDF #1 312-1, V-EASDF #2 312-2, H-UPF 404-1, H-UPF 404-2, H-SMF 405, H-SMF 405-1, H-SMF 405-2 H-DNS 410-1, or H-DNS 410-2 in FIGS. 3 to 7.

The network entity includes a processor 1030 that controls the overall operation of the network entity, a transceiver 1010 including a transmitter and a receiver, and a memory 1020. The components of the network entity are not limited the above examples, and the network entity may include more components or fewer components than the components illustrated in FIG. 10.

The transceiver 1010 may transmit and receive signals to/from at least one of other network entities, UEs, and base stations. The signals transmitted and received with at least one of other network entities, UEs, and base stations may include control information and data.

The processor 1030 may control the network entity to perform the operations of FIGS. 1 to 7 described above. The processor 1030, memory 1020, and transceiver 1010 do not necessarily have to be implemented as separate modules, and may be implemented as one component in the form of a single chip. Also, the processor 1030 and the transceiver 1010 may be electrically connected.

The memory 1020 may store a basic program for operating the network entity, an application program, and data such as configuration information. In particular, the memory 1020 provides stored data upon request from the processor 1030. The memory 1020 may include a storage medium or a combination of storage media such as ROM, RAM, a hard disk, CD-ROM, and DVD. Also, a plurality of the memories 1020 may be provided. The processor 1030 may perform the above described embodiments based on a program for performing the embodiments of the disclosure stored in the memory 1020.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first session management function (SMF) entity of a first network in a wireless communication system, the method comprising:

receiving, from an access and mobility management function (AMF) entity, a protocol data unit (PDU) session creates session management (SM) context request message including an identifier (ID) of a second SMF entity of a second network and a home routed session breakout (HR-SBO) allowed indication;

selecting an edge application server (EAS) discovery function (EASDF) entity of the first network, and a local user plane function (UPF) entity based on the HR-SBO allowed indication; and configuring the local UPF entity with an N4 rule including N6 routing information to forward a domain name system (DNS) traffic to the EASDF entity.

2. The method of claim 1, further comprising:

transmitting, to the EASDF entity, a request message to obtain an internet protocol (IP) address information of the EASDF entity; and receiving, from the EASDF entity, the IP address information of the EASDF entity.

3. The method of claim 1, further comprising:

transmitting, to the second SMF entity of the second network, a PDU session create request message including an internet protocol (IP) address of the EASDF entity of the first network; and receiving, from the second SMF entity, a PDU session create response message including a result associated with whether an HR-SBO is allowed for the first network, and information associated with an offloading policy for the first network.

4. The method of claim 3, wherein the PDU session create response message further includes a DNS server IP address of the second network as a DNS server address to be sent to a user equipment via a protocol configuration option (PCO).

5. The method of claim 1, further comprising:

configuring the EASDF entity with a DNS handling rule.

6. The method of claim 5, wherein the configuring the EASDF entity with the DNS handling rule comprises:

configuring the EASDF entity with a DNS server address of the second network as a default DNS server address to route a DNS query to a DNS server of the second network.

7. The method of claim 1, further comprising: transmitting, to the EASDF entity, a request message to create or update a DNS context, wherein the request message includes at least one of N6 routing information, or a DNS handling rule.

8. The method of claim 1, wherein whether an HR-SBO is allowed for the first network is identified based on SM subscription information.

9. A first session management function (SMF) entity of a first network in a wireless communication system, the first SMF entity comprising:

a transceiver; and a processor connected to the transceiver, wherein the processor is configured to:

receive, from an access and mobility management function (AMF) entity, a protocol data unit (PDU) session creates session management (SM) context request message including an identifier (ID) of a second SMF entity of a second network; and a home routed session breakout (HR-SBO) allowed indication select an edge application server discovery function (EASDF) entity of the first network, and a local user plane function (UPF) entity based on the HR-SBO allowed indication, and configure the local UPF entity with an N4 rule including N6 routing information to forward a domain name system (DNS) traffic to the EASDF entity.

10. The first SMF entity of claim 9, wherein the processor is further configured to:

transmit, to the EASDF entity, a request message to obtain an internet protocol (IP) address information of the EASDF entity, and receive, from the EASDF entity, the IP address information of the EASDF entity.

11. The first SMF entity of claim 9, wherein the processor is further configured to:

transmit, to the second SMF entity of the second network, a PDU session create request message including an internet protocol (IP) address of the EASDF entity of the first network; and receive, from the second SMF entity, a PDU session create response message including a result associated with whether an HR-SBO is allowed for the first network, and information associated with an offloading policy for the first network.

12. The first SMF entity of claim 11, wherein the PDU session create response message further includes a DNS server IP address of the second network as a DNS server address to be sent to a user equipment via a protocol configuration option (PCO).

13. The first SMF entity of claim 9, wherein the processor is further configured to:

configure the EASDF entity with a DNS handling rule.

14. The first SMF entity of claim 13, wherein the processor is further configured to: configure the EASDF entity with a DNS server address of the second network as a default DNS server address to route a DNS query to a DNS server of the second network.

15. The first SMF entity of claim 9, wherein the processor is further configured to: transmit, to the EASDF entity, a request message to create or update a DNS context, and wherein the request message includes at least one of N6 routing information, or a DNS handling rule.

16. The first SMF entity of claim 9, wherein the processor is further configured to:

wherein whether an HR-SBO is allowed for the first network is identified based on SM subscription information.

* * * * *